(12) United States Patent
Park et al.

(10) Patent No.: US 12,370,498 B2
(45) Date of Patent: Jul. 29, 2025

(54) SPIRAL WOUND-TYPE SEPARATION MEMBRANE MODULE AND METHOD OF MANUFACTURING SAME

(71) Applicant: Toray Advanced Materials Korea Inc., Gyeongsangbuk-do (KR)

(72) Inventors: Moo Keun Park, Gyeongsangbuk-do (KR); Sung Gun Cho, Gyeongsangbuk-do (KR); Sung Pyo Hong, Gyeongsangbuk-do (KR)

(73) Assignee: Toray Advanced Materials Korea Inc., Gyeongsangbuk-do (KR)

( * ) Notice: Subject to any disclaimer, the term of this patent is extended or adjusted under 35 U.S.C. 154(b) by 418 days.

(21) Appl. No.: 17/772,997

(22) PCT Filed: Apr. 8, 2020

(86) PCT No.: PCT/KR2020/004744
§ 371 (c)(1),
(2) Date: Apr. 28, 2022

(87) PCT Pub. No.: WO2021/085766
PCT Pub. Date: May 6, 2021

(65) Prior Publication Data
US 2023/0008479 A1 Jan. 12, 2023

(30) Foreign Application Priority Data
Oct. 29, 2019 (KR) .................. 10-2019-0135630

(51) Int. Cl.
*B01D 63/10* (2006.01)
*B01D 67/00* (2006.01)
(Continued)

(52) U.S. Cl.
CPC .......... *B01D 63/10* (2013.01); *B01D 67/002* (2013.01); *B01D 69/10* (2013.01); *B01D 71/26* (2013.01); *B01D 2313/23* (2013.01)

(58) Field of Classification Search
None
See application file for complete search history.

(56) References Cited

U.S. PATENT DOCUMENTS

| 5,425,877 | A | 6/1995 | Knappe |
| 7,138,058 | B2 | 11/2006 | Kurth et al. |

(Continued)

FOREIGN PATENT DOCUMENTS

| CN | 1676203 | 10/2005 |
| CN | 102715170 | 10/2012 |

(Continued)

OTHER PUBLICATIONS

European Search Report dated Apr. 3, 2002 directed to European Patent Application No. 00302985.7; 4 pgs.

(Continued)

*Primary Examiner* — Krishnan S Menon
(74) *Attorney, Agent, or Firm* — Morrison & Foerster LLP (57) ABSTRACT

A spiral wound-type separation membrane module and a method for manufacturing the same are provided. The spiral wound-type separation membrane module according to an exemplary embodiment of the present invention is implemented by including an outlet pipe; a filter assembly wound in a spiral wound on the outlet pipe; and an adhesion portion in which part or all of a heat-adhesive yarn wound to surround the outer surface of the filter assembly in the longitudinal direction of the outlet pipe is melted and fixed to the filter assembly. According to the above, the spiral wound-type separation membrane module and the method (Continued)

for manufacturing the same can significantly reduce the defect rate and process time and simultaneously exhibit an eco-friendly effect during disposal after use.

8 Claims, 3 Drawing Sheets

(51) Int. Cl.
  *B01D 69/10* (2006.01)
  *B01D 71/26* (2006.01)

(56) References Cited

U.S. PATENT DOCUMENTS

| | | | |
|---|---|---|---|
| 8,506,807 | B2 | 8/2013 | Lee et al. |
| 10,286,343 | B2* | 5/2019 | Paluszewski .......... B01D 35/15 |
| 2002/0027111 | A1 | 3/2002 | Ando et al. |
| 2002/0070158 | A1 | 6/2002 | Buecher et al. |
| 2008/0032719 | A1 | 2/2008 | Rosenberg |
| 2008/0185332 | A1 | 8/2008 | Niu et al. |
| 2009/0200228 | A1* | 8/2009 | Eisengraber-Pabst ...................... B01D 46/523 210/493.5 |
| 2010/0133183 | A1 | 6/2010 | Theron et al. |
| 2014/0083066 | A1 | 3/2014 | Bahukudumbi et al. |
| 2015/0014244 | A1 | 1/2015 | Shimura et al. |
| 2015/0041388 | A1* | 2/2015 | Hirozawa .............. B01D 69/04 210/457 |
| 2015/0144560 | A1 | 5/2015 | Taniguchi et al. |
| 2017/0144110 | A1 | 5/2017 | Shimura et al. |
| 2018/0133658 | A1 | 5/2018 | Seo et al. |
| 2018/0264411 | A1 | 9/2018 | Herron |
| 2019/0105208 | A1 | 4/2019 | Saevecke et al. |
| 2019/0209968 | A1 | 7/2019 | Hoz |
| 2019/0217286 | A1 | 7/2019 | Miyamoto et al. |
| 2020/0040484 | A1 | 2/2020 | Watanabe et al. |
| 2021/0291119 | A1 | 9/2021 | Lee et al. |
| 2021/0322927 | A1 | 10/2021 | Cho et al. |
| 2022/0011630 | A1 | 1/2022 | Ko et al. |
| 2022/0387936 | A1 | 12/2022 | Lee et al. |
| 2023/0347298 | A1 | 11/2023 | Lee |

FOREIGN PATENT DOCUMENTS

| | | |
|---|---|---|
| CN | 105694053 | 6/2016 |
| CN | 105771672 | 7/2016 |
| DE | 2020-15005969 | 11/2015 |
| EP | 1044718 | 10/2000 |
| JP | H 11-009921 | 1/1999 |
| JP | 2000-354743 | 12/2000 |
| JP | 2003-245530 | 9/2003 |
| JP | 2004-041870 | 2/2004 |
| JP | 2004-202409 | 7/2004 |
| JP | 2007-111606 | 5/2007 |
| JP | 2007-167783 | 7/2007 |
| JP | 4103131 | 6/2008 |
| JP | 2009-045595 | 3/2009 |
| JP | 2009-149573 | 7/2009 |
| JP | 2011-005455 | 1/2011 |
| JP | 2014-083515 | 5/2014 |
| JP | 2014-144441 | 8/2014 |
| JP | 2017-000939 | 1/2017 |
| JP | 2017-047417 | 3/2017 |
| JP | 2017-119932 | 7/2017 |
| JP | 2018-126706 | 8/2018 |
| KR | 10-0169484 | 10/1998 |
| KR | 10-0406735 | 8/2002 |
| KR | 10-2006-0011043 | 2/2006 |
| KR | 10-2009-0015087 | 2/2009 |
| KR | 10-2010-0008213 | 1/2010 |
| KR | 10-2011-0109387 | 10/2011 |
| KR | 10-2012-0137890 | 12/2012 |
| KR | 10-2013-0000477 | 1/2013 |
| KR | 10-2014-0046952 | 4/2014 |
| KR | 10-2014-0092306 | 7/2014 |
| KR | 10-2014-0138651 | 12/2014 |
| KR | 10-2015-0077062 | 7/2015 |
| KR | 10-2015-0083048 | 7/2015 |
| KR | 10-1541654 | 8/2015 |
| KR | 10-2016-0037584 | 4/2016 |
| KR | 10-2017-0103541 | 9/2017 |
| KR | 10-2017-0112994 | 10/2017 |
| KR | 10-2017-0126693 | 11/2017 |
| KR | 10-1966114 | 8/2019 |
| WO | WO 2013/058986 | 4/2013 |
| WO | WO 2013/129610 | 9/2013 |
| WO | WO 2020/027580 | 2/2020 |
| WO | WO 2021/054626 | 3/2021 |
| WO | WO 2021/054642 | 3/2021 |

OTHER PUBLICATIONS

Density Periodic Table—Periodic Table Wallpaper (Year: 2017).
U.S. Appl. No. 17/761,146, filed Mar. 16, 2022, by Lee et al. (copy not provided).
U.S. Appl. No. 17/761,564, filed Mar. 17, 2022, by Lee et al. (copy not provided).
U.S. Appl. No. 17/788,040, filed Jun. 22, 2022, by Yoon et al. (copy not provided).
Ramadan et al. "Review on Recent Applications of Antimicrobial Agents for Polyamide and Polypropylene." *Al-Azhar Bulletin of Science* (2012) 23.2-A: 1-28.
Royal Society of Chemistry, Antimony, Oct. 2019.

* cited by examiner

SPIRAL WOUND-TYPE SEPARATION MEMBRANE MODULE AND METHOD OF MANUFACTURING SAME

CROSS REFERENCE TO RELATED APPLICATIONS

This application is a national stage application under 35 U.S.C. § 371 of International Application No. PCT/KR2020/004744, filed internationally on Apr. 8, 2020, which claims priority to and the benefit of Korean Patent Application No. 10-2019-0135630, filed on Oct. 29, 2019, the disclosures of which are incorporated herein by reference in their entirety.

TECHNICAL FIELD

The present invention relates to a spiral wound-type separation membrane module, and more specifically to a spiral wound-type separation membrane module and a method for manufacturing the same.

BACKGROUND ART

Separation membranes are classified into microfiltration membranes (MF), ultrafiltration membranes (UF), nano-membranes (NF) and reverse osmosis membranes (RO) according to pore size.

In order to use these separation membranes to apply to liquid separation on an industrial scale, a significantly large membrane area is required. A device unit that integrates a large membrane area into a compact scale is called a separation membrane module, and currently, several types of membrane module types have been developed, such as flat-panel modules, tubular modules, hollow fiber modules, spiral wound-type modules and the like, and as for the osmotic membrane module, a spiral wound-type module is mainly used.

The spiral wound-type module performs a lapping process by winding a predetermined fiber on the outer surface, and conventionally, the lapping process was performed by spraying a mixture of an epoxy resin and a curing agent while winding the fibers, but as the epoxy resin and the curing agent are scattered and poor curing frequently occurs, the defect rate increases, and the process time becomes excessively long because the curing time is very long. Moreover, there was a problem in that it was not very eco-friendly even at the time of disposal after use due to the use of a mixed solution of an epoxy resin and a curing agent.

Accordingly, the situation is that there is an urgent need to research the lapping process conditions, materials therefor and a spiral wound-type separation membrane module that is implemented therefrom, which can significantly reduce the defect rate and process time and simultaneously exhibit an eco-friendly effect during disposal after use.

DISCLOSURE

Technical Problem

The present invention has been devised in view of the above points, and it is an object of the present invention to provide a spiral wound-type separation membrane module and a method for manufacturing the same that can significantly reduce the defect rate and process time and simultaneously exhibit an eco-friendly effect during disposal after use.

Technical Solution

In order to solve the aforementioned problems, the present invention provides a spiral wound-type separation membrane module, including an outlet pipe; a filter assembly wound in a spiral wound on the outlet pipe; and an adhesion portion in which part or all of a heat-adhesive yarn wound to surround the outer surface of the filter assembly in the longitudinal direction of the outlet pipe is melted and fixed to the filter assembly.

According to an exemplary embodiment of the present invention, the filter assembly may include a separation membrane provided to be bent to form at least one leaf; an inner spacer disposed within the leaf; and an outer spacer disposed outside the leaf.

In addition, the inner spacer may include a mesh sheet, and the outer spacer may include a tricot filtering channel.

In addition, the heat-adhesive yarn may include a support fiber and a heat-adhesive polymer formed on the surface of the support fiber and having a lower melting point or softening point than the support fiber.

In addition, the support fiber may include at least one selected from the group consisting of PET fiber, glass fiber and carbon fiber, and the heat-adhesive polymer may include at least one selected from the group consisting of polyethylene terephthalate and polyolefin-based polymers.

In addition, the heat-adhesive yarn may be wound in 1 to 4 layers so as to surround the outer surface of the filter assembly in the longitudinal direction of the outlet pipe.

In addition, one or more layers of the heat-adhesive yarn may be further wound on both ends of the outlet pipe in the longitudinal direction of the outer surface of the filter assembly.

In addition, the heat-adhesive yarn may be wound 290 to 320 times per 1 layer per a unit length of 1 m so as to surround the outer surface of the filter assembly in the longitudinal direction of the outlet pipe.

In addition, the heat-adhesive yarn may be a core-sheath heat-adhesive yarn comprising a support fiber and a heat-adhesive polymer at a weight ratio of 20:80 to 80:20.

In addition, the present invention provides a method for manufacturing a spiral wound-type separation membrane module, including winding a heat-adhesive yarn so as to surround the outer surface of a filter assembly in the longitudinal direction of an outlet pipe to the filter assembly wound in a spiral wound on the outlet pipe; heat treating to melt part or all of the heat-adhesive yarn; and solidifying the molten heat-adhesive yarn to adhere and be fixed to the filter assembly to form an adhesion portion.

According to an exemplary embodiment of the present invention, the heat treating may be performed at 100 to 250° C. for 30 seconds to 2 minutes.

In addition, the solidifying may be performed for 3 to 20 minutes.

Advantageous Effects

According to the present invention, the spiral wound-type separation membrane module and the method for manufacturing the same can significantly reduce the defect rate and process time and simultaneously exhibit an eco-friendly effect during disposal after use.

BEST MODE

Hereinafter, exemplary embodiments of the present invention will be described in detail with reference to the accompanying drawings such that those of ordinary skill in the art to which the present invention pertains can easily practice the present invention. The present invention may be embodied in many different forms and is not limited to the exemplary embodiments described herein. In order to clearly describe the present invention in the drawings, parts that are irrelevant to the description are omitted, and the same reference numerals are assigned to the same or similar components throughout the specification.

Figure 1:
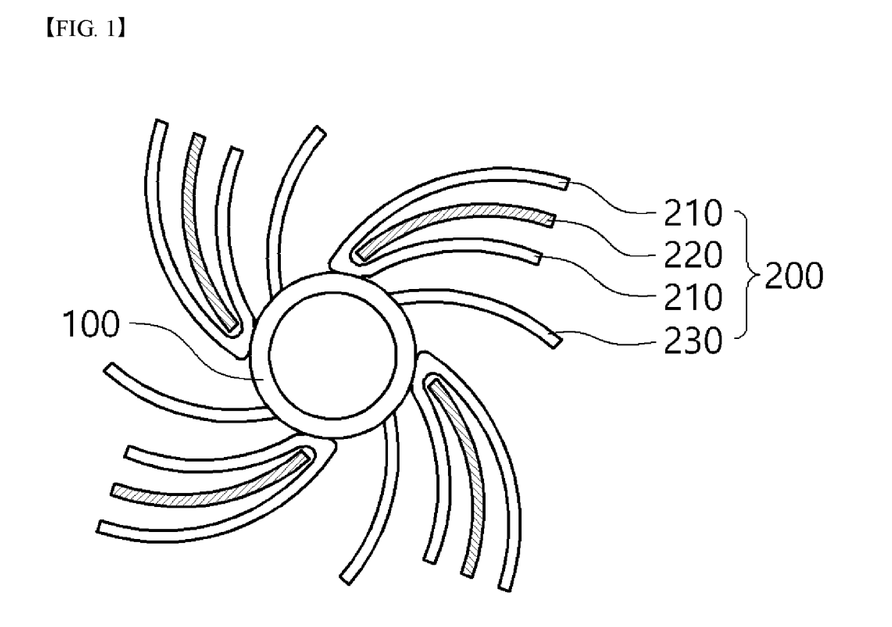
FIG. 1 is a cross-sectional schematic view of an outlet pipe and a filter assembly provided in the spiral wound-type separation membrane module according to an exemplary embodiment of the present invention.
Figure 2:
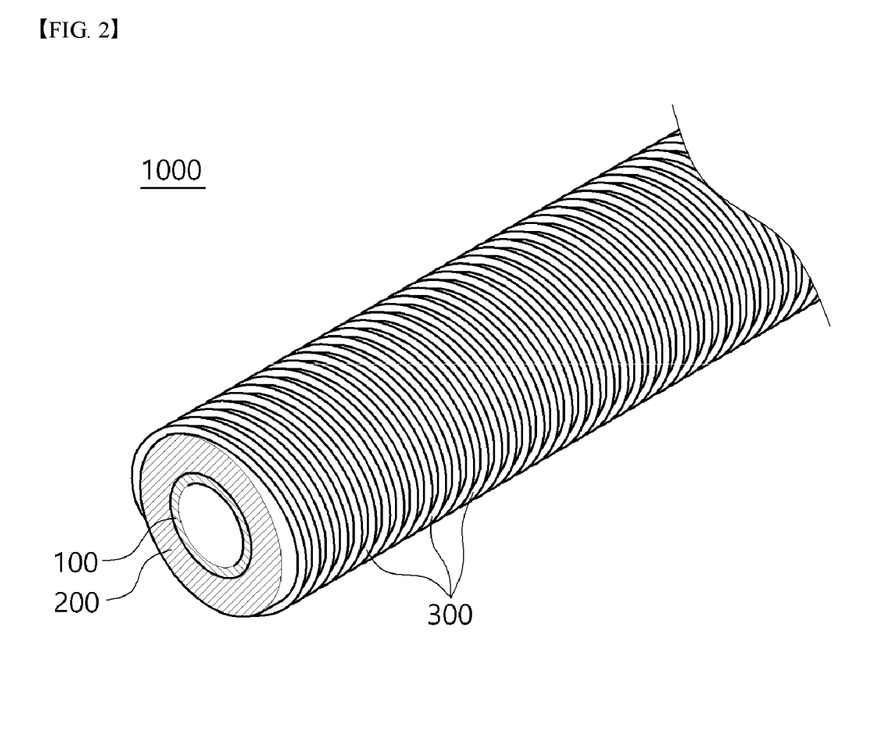
FIG. 2 is a perspective view of the spiral wound-type separation membrane module according to an exemplary embodiment of the present invention.

As illustrated in FIGS. 1 and 2, the spiral wound-type separation membrane module 1000 according to the present invention is implemented by including an outlet pipe 100; a filter assembly 200 wound in a spiral wound on the outlet pipe 100; and an adhesion portion 300 in which part or all of a heat-adhesive yarn wound to surround the outer surface of the filter assembly 200 in the longitudinal direction of the outlet pipe 100 is melted and fixed to the filter assembly 200.

First, the outlet pipe 100 may be formed of a hollow pipe member having at least one hole in which any one or both ends of both ends is opened and production water is introduced.

As long as it is a known outlet pipe applicable to the spiral wound-type separation membrane module, it may be used without limitation, and thus, the present invention does not particularly limit the same.

Next, the filter assembly 200 will be described.

The filter assembly 200 includes a separation membrane 210 provided to be bent to form at least one leaf; an inner spacer 220 disposed within the leaf; and an outer spacer 230 disposed outside the leaf.

Looking at the raw water treatment process by the spiral wound-type separation membrane module 1000, the inflow water passes through the separation membrane 210 through the inner spacer 220, and in the process of passing the separation membrane 210, dissolved salts, organic matter and the like are excluded, and pure water is separated. The separated water flows along the outer spacer 230, and the separated water is collected in the outlet pipe 100 located at the center and discharged to the outside of the spiral wound-type separation membrane module 1000.

As the separator 210 may be used without limitation as long as it is a separator that can be conventionally applied to a spiral wound-type separation membrane module in the art, the present invention does not particularly limit the same.

In addition, the inner spacer 220 serves to form a flow path inside the leaf, and specifically, as the inner spacer 220 is disposed in the leaf formed by bending the separation membrane 210, the formation of a flow path inside the leaf may be greatly improved as an inflow water feed channel.

The inner spacer 220 may be used without limitation as long as it is an inner spacer that can be conventionally applied to a spiral wound-type separation membrane module in the art, and it may preferably include a mesh sheet.

The mesh sheet may be used without limitation if it is a mesh sheet that can be used as an inner spacer of the filter assembly, and preferably, polypropylene, polyethylene or polyolefin-based copolymers in which polypropylene and polyethylene are mixed at a certain ratio may be used as a material for the mesh sheet.

The inner spacer 220 may have an average void of 6 mm$^2$ to 20 mm$^2$, preferably, 9 mm$^2$ to 17 mm$^2$ in order to smoothly form a flow path. If the void is less than 6 mm$^2$, there may be a problem that prevents flow path formation, and if it is more than 20 mm$^2$, there may be a problem that may reduce membrane deformation and fouling in high-pressure operation.

In addition, the average thickness of the inner spacer 220 may be 0.2 mm to 3 mm, preferably, 0.2 mm to 2.0 mm. If the average thickness of the inner spacer 220 is less than 0.2 mm, it is impossible to secure a sufficient flow path, and if it is more than 3 mm, the effective membrane area per unit volume is reduced, which may affect the deterioration of module performance.

The outer spacer 230 is disposed outside the leaf and serves to form a flow path outside the leaf, and specifically, the outer spacer 230 is disposed outside the leaf, and when there are two or more leaves, it is disposed between the leaves such that it may serve as a permeate spacer.

The outer spacer 230 may be used without limitation as long as it is an outer spacer that can be conventionally applied to a spiral wound-type separation membrane module in the art, and it may preferably include a tricot filtering channel.

The tricot filtering channel may be used without limitation in the case of a tricot that can be used as an outer spacer of the filter assembly, and preferably, it may formed as low-melting polyethylene terephthalate (LMP) which is modified by copolymerizing at least one resin or polyethylene terephthalate resin selected from the group consisting of polypropylene, polyethylene, poly-4-methylpentene, propylene-α olefin crystalline copolymer, polyethylene terephthalate, polybutylene terephthalate, polyarnide and polycarbonate, with nylon, polypropylene or epoxy resin.

Next, the adhesion portion 300 will be described.

As described above, part or all of the heat-adhesive yarn wound to surround the outer surface of the filter assembly 200 in the longitudinal direction of the outlet pipe 100 is melted and provided by being fused and fixed to the filter assembly 200.

Accordingly, the heat-adhesive yarn may include a heat-adhesive polymer in part or all thereof, and preferably, it may be a core-sheath heat-adhesive polymer including a support fiber and a heat-adhesive polymer formed on the surface of the support fiber and having a lower melting point or softening point than the support fiber.

In this case, the support fiber may be used without limitation as long as it is a fiber conventionally used in the art, and it may preferably include at least one selected from the group consisting of PET fiber, glass fiber and carbon fiber.

In addition, the support fiber may be a monofilament or a multifilament formed of fiber bundles, and when the support fiber is a multifilament, the multifilament may include one selected from the group consisting of the PET fiber, glass fiber, and carbon fiber alone, or it may include two or more selected from the group consisting of PET fiber, glass fiber and carbon fiber in combination.

In addition, the heat-adhesive polymer may be used without limitation as long as it is a heat-adhesive polymer having a lower melting point or softening point than the support fiber, and it may preferably include at least one selected from the group consisting of polyethylene terephthalate and polyolefin-based polymers.

In addition, the heat-adhesive yarn may be formed by twisting fibers including a heat-adhesive polymer to the support fiber, or it may be formed by coating the surface of the support fiber with a heat-adhesive polymer, but is not limited thereto.

In addition, the heat-adhesive yarn may include the support fiber and the heat-adhesive polymer at a weight ratio of 20:80 to 80:20, and may preferably include the support fiber and the heat-adhesive polymer at a weight ratio of 25:75 to 75:25. If the weight ratio of the support fiber and the heat-adhesive polymer is less than 20:80, the durability of the spiral wound-type separation membrane module may be reduced, such as failures that occur under high-pressure conditions, and if the weight ratio is more than 80:20, the heat-adhesive yarn may not be fixed to the outer surface of the membrane, and the durability of the spiral wound-type separation membrane module may be deteriorated, such as defects occurring.

Meanwhile, the heat-adhesive yarn may be wound in 1 to 4 layers so as to surround the outer surface of the filter assembly 200 in the longitudinal direction of the outlet pipe 100, and preferably, it may be wound in 1 to 3 layers so as to surround the outer surface of the filter assembly 200 in the longitudinal direction of the outlet pipe 100. If the wound heat-adhesive yarn is more than 4 layers, problems may occur when mounting to the housing as the outer diameter increases, or workability may be reduced, such as problems that may occur during mounting as the reference weight is exceeded. In addition, if the heat-adhesive yarn is not included, it may not be fixed to the outer surface as it does not solidify, and the durability of the spiral wound-type separation membrane module may be deteriorated, such as defects occurring.

In addition, one or more layers of the heat-adhesive yarn may be further wound on both ends of the outlet pipe in the longitudinal direction of the outer surface of the filter assembly. If one or more layers of the heat-adhesive yarn are not further wound on both ends of the outlet pipe in the longitudinal direction of the outer surface of the filter assembly, there may be a problem in that the inner member cannot be protected during the high-pressure process.

In addition, the heat-adhesive yarn may be wound 290 to 320 times per 1 layer per a unit length of 1 m, preferably, 300 to 310 times per 1 layer per a unit length of 1 m so as to surround the outer surface of the filter assembly in the longitudinal direction of the outlet pipe. If the heat-adhesive yarn is wound less than 290 times per 1 layer per a unit length of 1 m, the durability of the spiral wound-type separation membrane module may be deteriorated, such as failures that occur under high pressure conditions, and if it is wound more than 320 times per 1 layer per a unit length of 1 m, workability may be deteriorated, such as problems that may occur during mounting on the housing as the outer diameter increases, or problems that may occur during mounting as the reference weight is exceeded.

The spiral wound-type separation membrane module according to the present invention may be manufactured by including the steps of winding a heat-adhesive yarn so as to surround the outer surface of a filter assembly in the longitudinal direction of an outlet pipe to a filter assembly wound in a spiral wound on the outlet pipe; heat treating to melt part or all of the heat-adhesive yarn; and solidifying the molten heat-adhesive yarn to adhere and be fixed to the filter assembly to form an adhesion portion.

In the description of the method for manufacturing a spiral wound-type separation membrane module, it will be described by omitting the same description for each configuration described in the above-described spiral wound-type separation membrane module.

The step of heat treating to melt part or all of the heat-adhesive yarn may be performed at 100 to 250° C., preferably, at 120 to 220° C. for 30 seconds to 2 minutes, and preferably, 30 seconds to 1.5 minutes. If the temperature of the step of heat treating is less than 100° C. or the time of heat treating is less than 30 seconds, problems may occur such that the adhesion portion is not fixed to the filter assembly to a desired level, and if the temperature is more than 250° C. or the time of heat treating is more than 2 minutes, the defect rate may increase or the process time may increase.

In addition, the step of solidifying may be performed for 3 to 20 minutes, preferably, for 5 to 15 minutes. If the solidifying time is less than 3 minutes, problems may occur such that the adhesion portion is not fixed to the filter assembly to a desired level, and if the solidifying time is more than 20 minutes, a problem of increasing the process time may occur.

Figure 3:
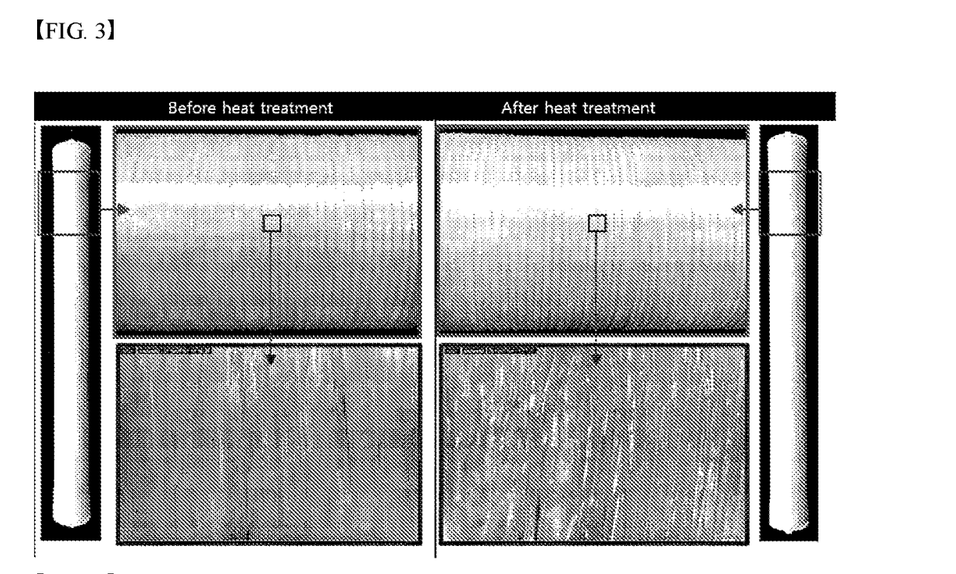
FIG. 3 is an image showing the spiral wound-type separation membrane module according to an exemplary embodiment of the present invention before and after heat treatment.
Figure 4:
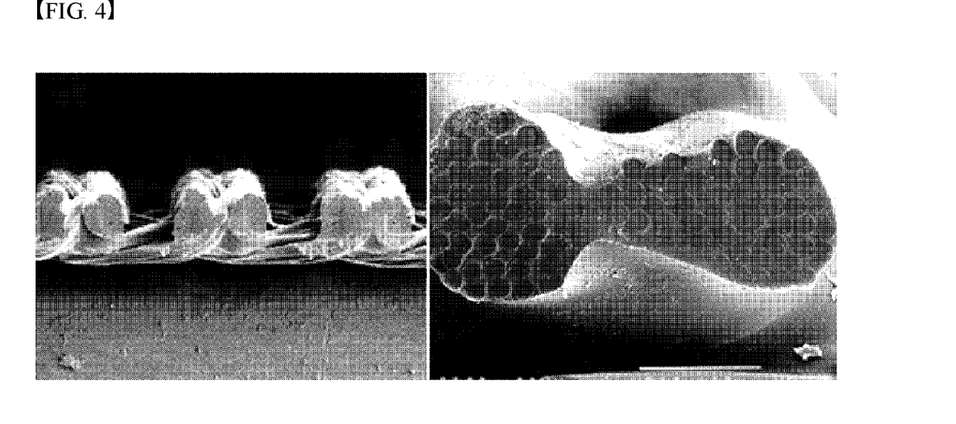
FIG. 4 is an SEM image of an adhesion portion provided in the spiral wound-type separation membrane module according to an exemplary embodiment of the present invention.

As the step of heat treating and the step of forming the adhesion portion are performed, the adhesion portion may be formed as illustrated in FIGS. 3 and 4.

The spiral wound-type separation membrane module and the method for manufacturing the same according to the present invention may significantly reduce the defect rate and process time and simultaneously exhibit an eco-friendly effect during disposal after use.

[Modes of the Invention]

The present invention will be described in more detail through the following examples, but the following examples are not intended to limit the scope of the present invention, and these examples should be construed to aid the understanding of the present invention.

Example 1

First, on an outlet pipe with a diameter of 8 inches, a separation membrane in which membranes (polyamide membranes) were sequentially stacked with a step spacing of 5 mm in a stepped structure was bent to form 23 leaves such that a mesh sheet made of a polyethylene and polypropylene composite material was disposed as an inner spacer in the separation membrane, and a spiral wound-type module was manufactured in which a filter assembly formed such that a tricot was disposed as an outer spacer in the region between the formed leaves was rolled into the structure shown in FIG. 1.

Then, one layer of a heat-adhesive yarn was wound on the spiral wound-type module to surround the outer surface of a filter assembly in the longitudinal direction of the outlet pipe, and after winding a heat-adhesive yarn in two layers on both ends in the longitudinal direction of the outlet pipe in the outer surface of the filter assembly, it was subjected to heat treatment at a temperature of 120° C. for 1 minute using a 2,000 W hot air blower, and a spiral wound-type separation membrane module was manufactured by waiting at room temperature for 10 minutes in order to solidify the molten heat-adhesive polymer to form a fixed adhesion portion by being fused to the filter assembly.

In this case, for the heat-adhesive yarn, a core-sheath heat-adhesive yarn including a support fiber made of PET material and a polyolefin heat-adhesive polymer having a melting point of 100° C. at a weight ratio of 50:50 was used, and the heat-adhesive yarn was wound 305 times per 1 layer per a unit length of 1 m.

Examples 2 to 17 and Comparative Examples 1 to 2

Spiral wound-type separation membrane modules as shown in Tables 1 to 4 were manufactured in the same manner as in Example 1, except that the number of layers of the heat-adhesive yarn wound, the number of layers of the heat-adhesive yarn wound on both ends, the number of twists in the heat-adhesive yarn, the weight ratio of the support fiber and the heat-adhesive polymer, the heat treatment temperature and time, and the solidification time were changed.

Comparative Example 3

A spiral wound-type separation membrane module was manufactured in the same manner as in Example 1, except that instead of the adhesion portion, a glass fiber in contact with the mixture solution of an epoxy resin and a curing agent was wound on the spiral wound-type module to surround the outer surface of the filter assembly in the longitudinal direction of the outlet pipe, and it was cured in a curing room at 60° C. for 6 hours.

Comparative Example 4

A spiral wound-type separation membrane module was manufactured in the same manner as in Comparative Example 3, except that it was cured in a curing room at 60° C. for 1 minute.

Experimental Example

The following items were evaluated for the spiral wound-type separation membrane modules manufactured in the examples and comparative examples, and the results are shown in Tables 1 to 4 below.

1. Evaluation of Defect Rates

The defective rates were evaluated for the spiral wound-type separation membrane modules according to the examples and comparative examples. Specifically, for the spiral wound-type separation membrane modules manufactured according to the examples and comparative examples, the defective rates were respectively evaluated by visual and tactile senses by 15 people with more than 10 years of experience in the relevant field. In this case, after calculating the average value out of 10 points, the defective rates were evaluated as 8 points or more—○, 4 points or more and less than 8 points—Δ, and less than 4 points—x.

2. Evaluation of High-Pressure Durability

When operating at 600 psi, the high-pressure durability was evaluated if there was no problem—○, and if there was any problem such as a channeling phenomenon in which the inner member protruded—x.

3. Evaluation of Flow Rates and Removal Rates

The flow rates and removal rates were evaluated by LTT-1 (Long Term Tester) for concentrated water (2,000 mg/L NaCl) under the conditions of pressure of 225 psi, temperature of 25° C. and 15% recovery (recovery=(production water flow rate/incoming flow rate)×100(%)).

4. Evaluation of Differential Pressure

With respect to concentrated water (2,000 mg/L NaCl), the differential pressure was measured for each flow rate while increasing the flow rate of the concentrated water through LTT-1 (Long Term Tester) at a pressure of 225 psi.

5. Evaluation of Workability

When mounting the housing, workability was evaluated if there was no problem—○, and if there was any problem such as exceeding the outer diameter and standard weight—x.

TABLE 1

| Classification | | Example 1 | Example 2 | Example 3 | Example 4 | Example 5 |
|---|---|---|---|---|---|---|
| Heat-adhesive yarn | Wound heat-adhesive yarn (layer) | 1 | 5 | 1 | 1 | 1 |
| | Heat-adhesive yarn on both ends (layer) | 2 | 6 | 1 | 2 | 2 |
| | Number of windings per 1 layer per 1 m (times) | 305 | 305 | 305 | 282 | 300 |
| | Weight ratio of support fiber and heat-adhesive polymer | 50:50 | 50:50 | 50:50 | 50:50 | 50:50 |
| Heat treatment step | Temperature (° C.) | 120 | 120 | 120 | 120 | 120 |
| | Time (minute) | 1 | 1 | 1 | 1 | 1 |
| Solidifying step | Time (minute) | 10 | 10 | 10 | 10 | 10 |
| Evaluation of defect rates | | ○ | ○ | ○ | Δ | ○ |
| Evaluation of high-pressure durability | | ○ | ○ | x | x | ○ |
| Flow rate (GPD) | | 2,361 | 2,352 | 2,588 | 2,361 | 2,361 |
| Removal rate (%) | | 99.66 | 99.66 | 99.52 | 99.66 | 99.66 |
| Differential pressure (psi) | 40 (1 pm) | 4.3 | 4.1 | 4.5 | 4.3 | 4.3 |
| | 60 (1 pm) | 8.9 | 8.6 | 9.1 | 8.9 | 8.9 |
| | 80 (1 pm) | 9.2 | 8.9 | 9.4 | 9.2 | 9.2 |
| Evaluation of workability | | ○ | x | ○ | x | ○ |
| Total process time (minute) | | 11 | 11 | 11 | 11 | 11 |

TABLE 2

| Classification | | Example 6 | Example 7 | Example 8 | Example 9 | Example 10 |
|---|---|---|---|---|---|---|
| Heat-adhesive yarn | Wound heat-adhesive yarn (layer) | 1 | 1 | 1 | 1 | 1 |
| | Heat-adhesive yarn on both ends (layer) | 2 | 2 | 2 | 2 | 2 |
| | Number of windings per 1 layer per 1 m (times) | 310 | 328 | 305 | 305 | 305 |
| | Weight ratio of support fiber and heat-adhesive polymer | 50:50 | 50:50 | 10:90 | 25:75 | 75:25 |
| Heat treatment step | Temperature (° C.) | 120 | 120 | 120 | 120 | 120 |
| | Time (minute) | 1 | 1 | 1 | 1 | 1 |
| Solidifying step | Time (minute) | 10 | 10 | 10 | 10 | 10 |
| Evaluation of defect rates | | ○ | Δ | Δ | ○ | ○ |
| Evaluation of high-pressure durability | | ○ | ○ | x | ○ | ○ |
| Flow rate (GPD) | | 2,361 | 2,361 | 2,361 | 2,361 | 2,361 |
| Removal rate (%) | | 99.66 | 99.66 | 99.66 | 99.66 | 99.66 |
| Differential pressure (psi) | 40 (1 pm) | 4.3 | 4.3 | 4.3 | 4.3 | 4.3 |
| | 60 (1 pm) | 8.9 | 8.9 | 8.9 | 8.9 | 8.9 |
| | 80 (1 pm) | 9.2 | 9.2 | 9.2 | 9.2 | 9.2 |
| Evaluation of workability | | ○ | x | ○ | ○ | ○ |
| Total process time (minute) | | 11 | 11 | 11 | 11 | 11 |

TABLE 3

| Classification | | Example 11 | Example 12 | Example 13 | Example 14 | Example 15 |
|---|---|---|---|---|---|---|
| Heat-adhesive yarn | Wound heat-adhesive yarn (layer) | 1 | 1 | 1 | 1 | 1 |
| | Heat-adhesive yarn on both ends (layer) | 2 | 2 | 2 | 2 | 2 |
| | Number of windings per 1 layer per 1 m (times) | 305 | 305 | 305 | 305 | 305 |
| | Weight ratio of support fiber and heat-adhesive polymer | 90:10 | 50:50 | 50:50 | 50:50 | 50:50 |
| Heat treatment step | Temperature (° C.) | 120 | 70 | 220 | 280 | 120 |
| | Time (minute) | 1 | 1 | 1 | 1 | 15 seconds |
| Solidifying step | Time (minute) | 10 | 10 | 10 | 10 | 10 |
| Evaluation of defect rates | | x | x | ○ | x | x |
| Evaluation of high-pressure durability | | x | x | ○ | x | x |
| Flow rate (GPD) | | 2,361 | 2,361 | 2,361 | 2,361 | 2,361 |
| Removal rate (%) | | 99.66 | 99.66 | 99.66 | 99.66 | 99.66 |
| Differential pressure (psi) | 40 (1 pm) | 4.3 | 4.3 | 4.3 | 4.3 | 4.3 |
| | 60 (1 pm) | 8.9 | 8.9 | 8.9 | 8.9 | 8.9 |
| | 80 (1 pm) | 9.2 | 9.2 | 9.2 | 9.2 | 9.2 |
| Evaluation of workability | | ○ | ○ | ○ | ○ | ○ |
| Total process time (minute) | | 11 | 11 | 11 | 11 | 10.25 |

TABLE 4

| Classification | | Example 16 | Example 17 | Comparative Example 1 | Comparative Example 2[1)] | Comparative Example 3 | Comparative Example 4 |
|---|---|---|---|---|---|---|---|
| Heat-adhesive yarn | Wound heat-adhesive yarn (layer) | 1 | 1 | — | 1 | 1 | 1 |
| | Heat-adhesive yarn on both ends (layer) | 2 | 2 | — | 2 | 2 | 2 |
| | Number of windings per 1 layer per 1 m (times) | 305 | 305 | — | 305 | 305 | 305 |
| | Weight ratio of support fiber and heat-adhesive polymer | 50:50 | 50:50 | 50:50 | 50:50 | 50:50 | 50:50 |

TABLE 4-continued

| Classification | | Example 16 | Example 17 | Comparative Example 1 | Comparative Example 2[1] | Comparative Example 3 | Comparative Example 4 |
|---|---|---|---|---|---|---|---|
| Heat treatment step | Temperature (° C.) | 120 | 120 | — | — | Epoxy curing at 60° C. for 6 hours | Epoxy curing at 60° C. for 1 minute |
| | Time (minute) | 5 | 1 | — | — | | |
| Solidifying step | Time (minute) | 10 | 1 | — | — | | |
| Evaluation of defect rates | | Δ | x | x | x | ○ | x |
| Evaluation of high-pressure durability | | ○ | x | x | x | ○ | x |
| Flow rate (GPD) | | 2,353 | 2,353 | 2,353 | 2,353 | 2,353 | 2,353 |
| Removal rate (%) | | 99.66 | 99.66 | 99.66 | 99.66 | 99.66 | 99.66 |
| Differential pressure (psi) | 40 (1 pm) | 4.2 | 4.2 | 4.2 | 4.2 | 4.2 | 4.2 |
| | 60 (1 pm) | 8.9 | 8.9 | 8.9 | 8.9 | 8.9 | 8.9 |
| | 80 (1 pm) | 9.2 | 9.2 | 9.2 | 9.2 | 9.2 | 9.2 |
| Evaluation of workability | | ○ | ○ | ○ | ○ | ○ | ○ |
| Total process time (minute) | | 15 | 2 | 0 | 0 | 60 | 1 |

[1] Comparative Example 2 was manufactured by replacing the heat-adhesive yarn with a general support fiber alone As can be seen from Tables 1 to 4, it can be confirmed that Examples 1, 5, 6, 9, 10 and 13, which satisfied all of the number of layers of the heat-adhesive yarn wound, the number of layers of the heat-adhesive yarn wound on both ends, the number of twists in the heat-adhesive yarn, the weight ratio of the support fiber and heat-adhesive polymer, the heat treatment temperature and time, the solidification time, and the components for fixing the fibers to surround the outer surface of the filter assembly according to the present invention, exhibit the same levels of the flow rates, removal rates and differential pressures and had remarkably low defect rates, remarkably excellent high-pressure durability and workability, and remarkably short process times, compared to Examples 2 to 4, 7, 8, 11, 12, 14 to 17 and Comparative Examples 1 to 4 in which any one of the above was omitted.

Although an exemplary embodiment of the present invention has been described above, the spirit of the present invention is not limited to the exemplary embodiment presented in the present specification, and those skilled in the art who understand the spirit of the present invention will be able to easily suggest other exemplary embodiments by modifying, changing, deleting or adding components within the scope of the same spirit, but this is also said to be within the scope of the present invention.

The invention claimed is:

1. A spiral wound-type separation membrane module, comprising:
   an outlet pipe;
   a filter assembly wound in a spiral wound on the outlet pipe; and
   an adhesion portion in which part or all of a heat-adhesive yarn wound to surround the outer surface of the filter assembly in the longitudinal direction of the outlet pipe is melted and fixed to the filter assembly,
   wherein the heat-adhesive yarn is a core-sheath heat-adhesive yarn comprising a support fiber and a heat-adhesive polymer.

2. The spiral wound-type separation membrane module of claim 1, wherein the filter assembly comprises:
   a separation membrane provided to be bent to form at least one leaf;
   an inner spacer disposed within the leaf; and
   an outer spacer disposed outside the leaf.

3. The spiral wound-type separation membrane module of claim 2,
   wherein the inner spacer comprises a mesh sheet, and
   wherein the outer spacer comprises a tricot filtering channel.

4. The spiral wound-type separation membrane module of claim 1, wherein the heat-adhesive yarn comprises a support fiber and a heat-adhesive polymer formed on the surface of the support fiber and having a lower melting point or softening point than the support fiber.

5. The spiral wound-type separation membrane module of claim 4, wherein the support fiber comprises at least one selected from the group consisting of PET fiber, glass fiber and carbon fiber, and
   wherein the heat-adhesive polymer comprises at least one selected from the group consisting of polyethylene terephthalate and polyolefin-based polymers.

6. The spiral wound-type separation membrane module of claim 1, wherein the heat-adhesive yarn is wound in 1 to 4 layers so as to surround the outer surface of the filter assembly in the longitudinal direction of the outlet pipe.

7. The spiral wound-type separation membrane module of claim 6, wherein the heat-adhesive yarn is wound 290 to 320 times per 1 layer per a unit length of 1 m so as to surround the outer surface of the filter assembly in the longitudinal direction of the outlet pipe.

8. The spiral wound-type separation membrane module of claim 1, wherein the heat-adhesive yarn is a core-sheath heat-adhesive yarn comprising a support fiber and a heat-adhesive polymer at a weight ratio of 20:80 to 80:20.

* * * * *